L. A. MARTENS.
TORQUE EQUALIZING MEANS.
APPLICATION FILED JULY 8, 1918.
1,309,257.
Patented July 8, 1919.
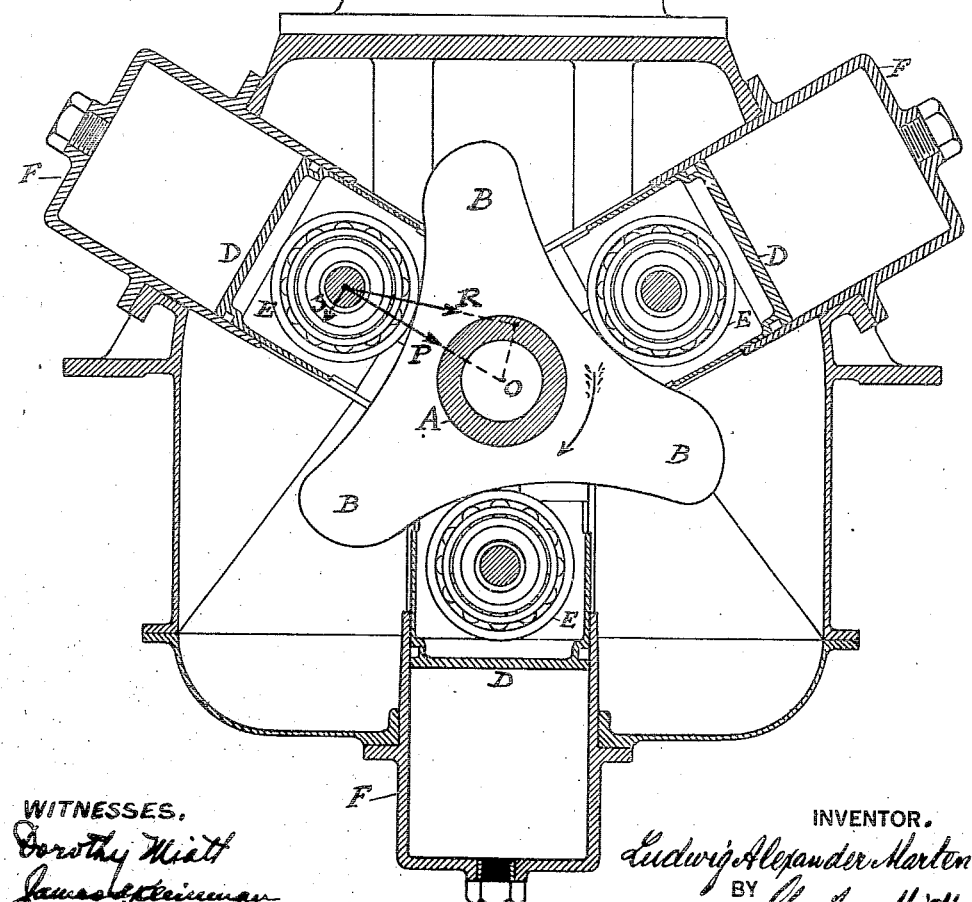

UNITED STATES PATENT OFFICE.

LUDWIG ALEXANDER MARTENS, OF TEANECK, NEW JERSEY, ASSIGNOR TO KINETIC ENGINEERING COMPANY, INC., OF NEW YORK, N. Y., A CORPORATION OF NEW YORK.

TORQUE-EQUALIZING MEANS.

1,309,257.   Specification of Letters Patent.   Patented July 8, 1919.

Application filed July 8, 1918. Serial No. 243,985.

*To all whom it may concern:*

Be it known that I, LUDWIG ALEXANDER MARTENS, a citizen of Russia, and a resident of Teaneck, county of Bergen, and State of New Jersey, have invented certain new and useful Improvements in Torque-Equalizing Means, of which the following is a specification.

The object of my invention is to compensate for variations in transmission of motion and power to rotatable parts, as for instance in the change from reciprocatory to rotary motion in the case of steam and combustion engines, air compressers, pumps, etc., and also wherever periodical changes of torque occur in power transmitting apparatus, as in certain kinds of electrical and printing machinery, etc.

The invention consists essentially in mechanism for absorbing the surplus energy of transmission and of certain periods of torque, and imparting the same to intermediate periods so as to equalize the motion and pressure substantially as hereinafter set forth.

In the accompanying drawings,

Figure 1, represents more or less symbolically a medial vertical cross section of a six cylinder, four cycle, internal combustion engine embodying the essential features of my invention;

Fig. 2, represents a portion of a torque and recoil diagram of such a six cylinder engine;

Fig. 3, is a similar view of the diagram of a twelve cylinder engine.

The diagrams shown in Figs. 2 and 3 for the purpose of illustrating the practical advantages of my invention were prepared from a number of actual cylinder diagrams representing the maximum, minimum and average effects of the engines,—the horizontal lines representing the mean torque for each of these effects. Under torque recoil I understand couples of forces represented by the resultant of the side pressures of the pistons of cross heads and by the crank shaft pressure on the main bearings. The moments of these couples are equal and act in opposite direction to the turning moment of the engine. Therefore the torque diagram of an engine may serve as a recoil diagram of the same.

In the six cylinder engine represented in Fig. 1, the crank shaft A, is provided, preferably but not necessarily centrally, with three equi-distant rigid radial cams B, which are shaped in accordance with the torque diagram of the engine. Contacting with these cam surfaces are rollers E, mounted in hollow pistons D, positioned in cylinders F. The rollers E, and pistons D, are reciprocated by the cams B, in such manner that the air inside said cylinders is alternately compressed and expanded, and acts as an elastic resilient cushion to maintain contact of said rollers E, with the cam surfaces. The compression of the air in the cylinders F, absorbs an amount of energy equal to surplus energy between the points H, and K, of the torque diagram Fig. 2. When the position of the engine crank shaft A, corresponds with the point K, of said diagram the whole of the surplus energy is absorbed and the cams B, occupy positions in which the maximum compression in the cylinders F, is reached. During the further movement of the cams B, the pistons D, move toward the center line of the crank shaft, and the pressure of the expanding air is exerted as a driving force on the crank shaft A, thereby compensating for the deficiency of energy between the points K, and L, of said diagram Fig. 2. This process of absorption of the surplus energy and delivery of same back to the engine takes place at the time and at the rate the surplus and deficiency of energy are developed in the engine, so that the resultant torque is consequently constant and uniform.

As shown on the diagrams, the torque curves intersect the horizontal lines representing the mean torques approximately at the same positions of the crankshaft during the maximum, minimum and average efforts of the engine. The amount of surplus energy of all the above efforts is also approximately constant. Therefore, the shape of the cams B, adjusted according to one of the torque curves is suitable also for the others.

The recoil of the described torque equalizer, *i. e.*, the moment of the force S is equal and acting in opposite direction to the turning moment of the force R, representing the torque of the equalizer. The same absorbs accordingly not only the surplus energy of the engine but also the surplus of the engine recoil between the points H and K, of the diagram, and increases this recoil between the points K and L, thereby making this recoil a constant represented by the horizontal line of this diagram.

The described method of torque and recoil equalization is, as before intimated, applicable not only to prime movers, such as steam and internal combustion engines, but also to working machines, such as air compressers, pumps, certain kinds of electrical machinery, printing machinery, with heavy reciprocatory parts, etc.,—but also to any form of apparatus in which the driving and resisting forces are of a periodically changing nature.

Among the advantages attained by my system of torque and recoil equalization are:—the practicability of using extremely light fly wheels, sufficient only to overcome starting resistance; absence of vibration otherwise due to periodically changing forces; the possibility of running machinery at relatively high speed with safety; the use of light foundations, etc.

What I claim as my invention and desire to secure by Letters Patent is,

1. Mechanism for effecting equalization of torque and torque recoil of machinery in which the driving or resisting forces, or both, are of a periodically changing nature, comprising reciprocating air compression means actuated by rotatable cams timed with relation to the torque to alternately absorb the surplus energy and deliver the same during relative deficiency of energy, substantially as described, thereby producing constant resultant torque and constant recoil, for the purpose set forth.

2. Mechanism for effecting equalization of torque and torque recoil of machinery in which the driving or resisting forces, or both, are of a periodically changing nature, comprising an air compression cylinder, a piston reciprocated therein by means of rotatable cams, and said rotatable cams arranged to alternately compress the air contained in said cylinder and then allow said air to expand, said cams being shaped in accordance with the torque of the machine so as to alternately absorb the surplus energy and deliver it to the machine at the rate and at the time the surplus and deficiency of energy are developed, substantially as described, thereby producing a constant resultant torque and a constant recoil, for the purpose set forth.

3. Mechanism for effecting equalization of torque and torque recoil of machinery in which the driving or resisting forces, or both, are of a periodically changing nature, comprising a plurality of air compression cylinders, pistons reciprocated therein by means of rotatable cams, and said rotatable cams arranged to alternately compress the air contained in said cylinders and then allow said air to expand, said cams being shaped in accordance with the torque of the machine so as to alternately absorb the surplus energy and deliver it to the machine at the rate and at the time the surplus and deficiency of energy are developed, substantially as described, producing a constant resultant torque and a constant recoil, for the purpose set forth.

LUDWIG ALEXANDER MARTENS.

Witnesses:
JAMES S. KLEINMAN,
VIOLET CAMPBELL.